US006141115A

United States Patent [19]

Naruse

[11] Patent Number: 6,141,115

[45] **Date of Patent: *Oct. 31, 2000**

[54] PRINTING APPARATUS AND PRINTING METHOD

[75] Inventor: Kenichi Naruse, Tokyo, Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/051,839

[22] PCT Filed: Sep. 2, 1997

[86] PCT No.: PCT/JP97/03060

§ 371 Date: Apr. 22, 1998

§ 102(e) Date: Apr. 22, 1998

[87] PCT Pub. No.: WO98/09821

PCT Pub. Date: Mar. 12, 1998

[30] Foreign Application Priority Data

Sep. 4, 1996 [JP] Japan .................................... 8-234326

[51] Int. Cl.[7] ...................................................... G06F 15/00

[52] U.S. Cl. ......................... 358/1.9; 358/1.17; 358/1.18; 400/237

[58] Field of Search .................................... 395/109, 116, 395/117; 400/237, 207, 201, 206, 240; 347/214, 217, 177; 358/1.9, 1.17, 1.18

[56] References Cited

U.S. PATENT DOCUMENTS 4,616,236 10/1986 Watanabe et al. .
5,104,247 4/1992 Ohshima .
5,445,463 8/1995 Paranjpe .................................. 400/240
5,462,372 10/1995 Hirono ...................................... 400/83

OTHER PUBLICATIONS

Patent Abstracts of Japan; vol. 010, No. 187, Jul. 2, 1986; & JP 61 031282 A (Fuji Xerox Co., Ltd.), Feb. 13, 1986.

Patent Abstracts of Japan; vol. 015, No. 105, Mar. 13, 1991; & JP 03 001978 A (Canon Inc.), Jan. 8, 1991.

Patent Abstracts of Japan; vol. 018, No. 206; Apr. 12, 1994; & JP 06 008597 A (NEC Home Electron Ltd.), Jan. 18, 1994.

Patent Abstracts of Japan; vol. 008, No. 164, Jul. 28, 1984; & JP 59 057761 A (Toshiba KK), Apr. 3, 1984.

*Primary Examiner*—Edward L. Coles
*Assistant Examiner*—Mark Wallerson
*Attorney, Agent, or Firm*—Frishauf, Holtz, Goodman, Langer & Chick, P.C.

[57] ABSTRACT

A printing apparatus is provided for printing an image using sequentially transferring inks for a plurality of colors, which are repeatedly arranged on an ink ribbon (R) with each having a predetermined length (l), to an elongated recording sheet (T) so that the transferred inks are overlapped. The printing apparatus includes a data input section (12) for inputting a plurality of data items representing images to be printed, a control section (11, S1) for calculating each of print lengths (Ln) of the images to be printed in response to the inputted plurality of data items, and a data storage section (14*a,* 14*c*) for storing the inputted plurality of data items. The control section (11, S3–S13) obtains a group of the data items whose total print lengths (Ln), calculated from the plurality of data items stored in the data storage section (14*a,* 14*c*), does not exceed the predetermined length (l). A printer (17) then prints an image corresponding to the obtained group of the data items by sequentially transferring the inks for the plurality of colors to the recording sheet (T).

21 Claims, 7 Drawing Sheets

| n | PRINT DATA ITEMS | PRINT LENGTHS(Ln) | ADDITION-FINISHED FLAGS(Kn) | PRINT-FINISHED FLAGS(Sn) |
|---|---|---|---|---|
| 1 | AB | 2cm | 0 | 0 |
| 2 | ABC | 3cm | 0 | 0 |
| 3 | ABCD | 4cm | 0 | 0 |
| 4 | ABCDE | 5cm | 0 | 0 |
| 5 | A | 1cm | 0 | 0 |
| 6 | FGHIJ | 5cm | 0 | 0 |
| 7 | ABCDEFGH | 8cm | 0 | 0 |

Na

PRINTING APPARATUS AND PRINTING METHOD

TECHNICAL FIELD

The present invention relates to a printing apparatus, a printing method, and a storage medium storing a program for realizing the printing method. More specifically, the present invention relates to an apparatus and a method for printing a color image with an ink ribbon on which inks for three colors, yellow (Y), magenta (M) and cyan (C), are repeatedly arranged in the lengthwise direction.

BACKGROUND ART

A tape printer which can print images, corresponding to character data or symbol data, on a tape for labels, to be stuck on cassette tapes or files, has been conventionally in practical use. Also a color tape printer which can print color images on a tape has been used practically of late.

Such a color tape printer uses an ink ribbon on which are repeatedly arranged inks for three colors, yellow (Y), magenta (M) and cyan (C), each of which has a constant length. In the color tape printer, a thermal head is heated and driven in accordance with print data to sequentially transfer the inks for the three colors held by the ink ribbon to the tape, so that the transferred inks are overlapped. Thus, a color image is printed on the tape. When this color tape printer prints an image with the colored ink, the tape and the ink ribbon are carried in the same direction, then only the tape is carried in the reverse direction before the image is printed using the next ink color so that the print start position is adjusted. In this color tape printer, the color tape printer carries the ink ribbon in one direction.

The maximum length of the color printing accomplished by the color tape printer (hereinafter referred as the maximum print length) during one printing operation (the transference of the inks for three colors, Y, M and C, are performed once, respectively) corresponds to the length of each of the colored inks. That is, if the inks for Y, M and C are repeatedly arranged on the ink ribbon at intervals of 10 cm, the maximum length of the color printing for one printing operation is 10 cm.

When the length of an image, corresponding to print data prepared with the tape printer, to be printed on the tape in the lengthwise direction equals the length of each of the inks arranged on the ink ribbon, the image corresponding to the print data can be printed while using the inks for Y, M and C so that unused inks do not remain.

However, when the length of an image to be printed is shorter than the maximum print length, the colored inks on the ink ribbon are only partially used because the ink ribbon is carried in the one direction. As a result, unused inks remain on the ink ribbon. Especially when the tape printer prints many short images, the quantity of unused inks remaining on the ink ribbon increases.

SUMMARY OF THE INVENTION

It is an object of the present invention to provide a printing apparatus and a printing method for printing color images while using inks repeatedly arranged on an ink ribbon so that unused inks do not remain, and a storage medium storing a program for realizing the printing method.

To accomplish the above object, a printing apparatus, according to the first aspect of the present invention, for printing an image by sequentially transferring inks for a plurality of colors, which are repeatedly arranged on an ink ribbon and which each has a predetermined length, to an elongated recording sheet so that the transferred inks are overlapped, is characterized in that the printing apparatus comprises:

- data input means for inputting a plurality of data items representing images to be printed;
- print length calculation means for calculating each of the print lengths of the images to be printed in response to the plurality of data items input through the data input means;
- data storage means for storing the plurality of data items input through the data input means;
- group calculation means for obtaining a group of the data items whose total print length, calculated by the print length calculation means from the plurality of data items stored in the data storage means, does not exceed the predetermined length; and
- print means for printing an image corresponding to the group of the data items obtained by the group calculation means by sequentially transferring the inks for the plurality of colors to the recording sheet so that the transferred inks are overlapped.

According to this printing apparatus, the group calculation means obtains the group of the data items whose total print length does not exceed the predetermined length. The printing means prints images corresponding to the group of the data items, obtained by the group calculation means, as a unit. Thus, the printing apparatus can print images corresponding to the data items while using the color inks arranged on the ink ribbon so that unused inks do not remain.

The above described printing apparatus may further comprise print length storage means for storing each of the print lengths, calculated by the print length calculation means, while associating the print lengths with the plurality of data items. In this case, the group calculation means may obtain the group of the data items while referring to the print length stored in the print length storage means.

The above described printing apparatus may further comprise group information storage means for storing group information, which represents the data items included in the group calculated by the group calculation means, while associating the group information with the data items. In this case, the printing means may print images corresponding to the data items in accordance with the group information stored in the group information storage means.

The above described printing apparatus may further comprise print information storage means for storing print information, representing the data items included in the group printed by the printing means, while associating the print information with the data items. In this case, the printing means may print images corresponding to the data items.

The above described printing apparatus may further comprise data sorting means for sorting the plurality of data items stored in the data storage means in accordance with the print lengths calculated by the print length calculation means. In this case, the group calculation means may obtain the group of the data items from the plurality of data items sorted by the data sorting means.

The above described printing apparatus is characterized in that the group calculation means comprises:

- addition means for adding corresponding print length to the plurality of data items sequentially stored in the data storage means;
- first length detection means for detecting whether an addition result obtained by the addition means is shorter than the predetermined length;

second length detection means for further detecting whether the addition result obtained by the addition means equals the predetermined length when the first length detection means detects that the addition-result is not shorter than the predetermined length;

subtraction means for subtracting the print length last added by the addition means when the second length detection means detects that the addition result does not equal to the predetermined length; and remaining data detection means for detecting whether the data items, whose corresponding print length is not targeted for addition by the addition means, remain or not.

In this case, the group of the data items is comprised of the data items whose corresponding print length is targeted by the addition means to be added and the corresponding print length is not targeted for subtraction by the subtraction means, and the printing means prints images corresponding to the group of the data items when the second length detection means detects that the addition result equals the predetermined length, or when the remaining data detection means detects that no data items remain, whose corresponding print length is not targeted for addition.

In the above described printing apparatus, the printing means may print images corresponding to the group of the data items in response to one of the group of the data items obtained by the group calculation means.

The above described printing apparatus may further comprise group storage means for storing a plurality of the groups of the data items obtained by the group calculation means. In this case, the printing means may sequentially print images corresponding to each of the groups of the data items stored in the group storage means.

In the above described printing apparatus, the printing means may print marks at boundary positions among images corresponding to each of data items in the group when images corresponding to the group of the data items are printed.

To accomplish the above object, a printing method, according to the second aspect of the present invention, for printing an image by transferring inks for a plurality of colors, which are repeatedly arranged on an ink ribbon and which each has a predetermined length, to an elongated recording sheet so that the transferred inks are overlapped, the printing method is characterized by including:

print length calculation step for calculating a print length for each image to be printed corresponding to a plurality of data items representing the images to be printed;

group calculation step for obtaining, from the plurality of data items, a group of the data items whose total print length calculated by the print length calculation step does not exceed the predetermined length; and printing step for printing images, corresponding to the group of the data items obtained by the group calculation step, by transferring the inks for the plurality of colors to the recording sheet so that the inks are overlapped.

According to this printing method, the group of the data items whose total print length does not exceed the predetermined length is obtained at the group calculation step. Corresponding images are printed at the printing step while referring to the group of the data items, obtained at the group calculation step, as a unit. Because of this, images corresponding to each of the data items can be printed while using each of the colored inks arranged on the ink ribbon so that unused inks do not remain.

To accomplish the above object, a computer-readable storage medium, according to the third aspect of the present invention storing, a program to accomplish a printing method for printing images by sequentially transferring inks for a plurality of colors, which are repeatedly arranged on an ink ribbon and which each has a predetermined length, to an elongated recording sheet, the storage medium is characterized by storing a program for accomplishing:

print length calculation step for calculating a print length each image to be printed corresponding to a plurality of data items representing the images to be printed;

group calculation step for obtaining groups of the data items whose total print length calculated by the print calculation step does not exceed the predetermined length; and printing step for printing images, corresponding to the group of the data items obtained by the group calculation step, by transferring the inks for the plurality of colors.

DETAILED DESCRIPTION

An embodiment of the present invention will now be described with reference to accompanying drawings.

Figure 1:
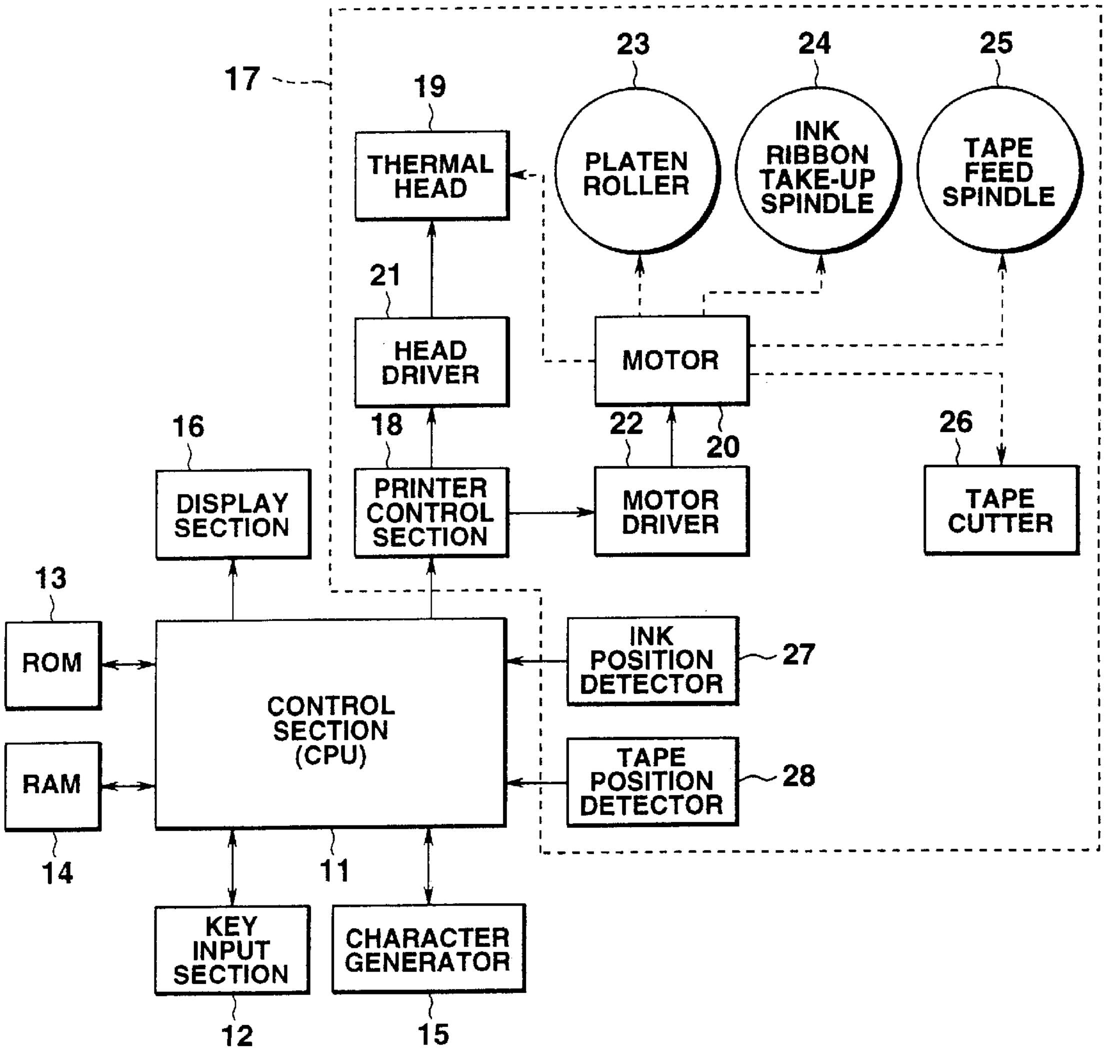
FIG. 1 is a block diagram showing the circuit structure of a color tape printer in an embodiment of the present invention.

FIG. 1 is a block diagram showing a circuit structure of a color tape printer in this embodiment.

As shown in FIG. 1, the color tape printer comprises a control section 11, a key input section 12, a ROM 13, a RAM 14, a character generator 15, a display section 16, and a printer section 17.

The control section 11 comprises a CPU (Central Processing Unit). Connected to the control section 11 are the key input section 12, the ROM 13, the RAM 14, the character generator 15, the display section 16, a printer control section 18 (to be described later) in the printer section 17, an ink position detector 27 (to be described later) in the printer section 17, and a tape position detector 28 (to be described later) in the printer section 17. The control section 11 executes a program stored in the ROM 13 while using the RAM 14 as a work area in response to control signals input at the key input section 12.

The key input section 12 comprises character/symbol input keys for inputting alphanumeric characters, symbols, or the like, and control keys such as a cursor key, a select/execute key, a mode set key, a register key, and a print key.

The ROM 13 previously stores a processing program to be executed by the control section 11. The RAM 14 is used as a work area for the processing program executed by the control section 11. In the case for executing a later-described print process in this embodiment, areas for storing later-described data registers are prepared in the RAM 14. The character generator 15 previously stores bitmap patterns corresponding to characters and numeric characters input through the character/symbol input keys, or codes for symbols.

The display section 16 comprises a liquid crystal display device, and displays characters input at the key input section 12 and images corresponding to images to be printed, or the like.

The printer section 17 prints images on a tape using the thermal transfer method. As shown by the block diagram of a circuit structure in FIG. 1 and by of a schematic cross sectional view FIG. 2, the printer section 17 comprises the printer control section 18, a thermal head 19, a motor 20, a head driver 21, a motor driver 22, a platen roller 23, an ink ribbon take-up spindle 24, a tape feed spindle 25, a tape cutter 26, the ink position detector 27, and the tape position detector 28.

Figure 3:
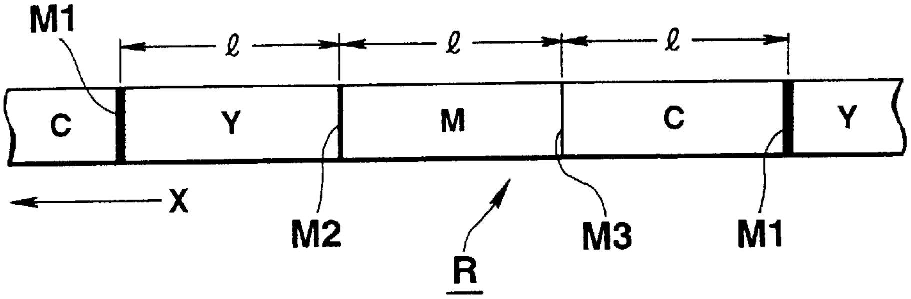
FIG. 3 is a diagram showing the structure of a color ink ribbon used in a printer section shown in FIG. 2.
Figure 4:
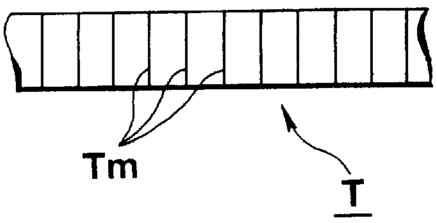
FIG. 4 is a diagram showing the back of a tape used in a printer section shown in FIG. 2.

Detachably attached to the printer section 17 is a tape cartridge 29 containing an elongated tape T wound on a reel, and an ink ribbon R, wound on a reel, on which inks for three colors, yellow (Y), magenta (M) and cyan (C), are repeatedly arranged in constant lengths (for example, 10 cm). The width of the ink ribbon R corresponds to the width of the tape T. As shown in FIG. 3, index marks M1 to M3, which are colored black, for searching the inks for each of the colors are disposed at boundary positions among the inks Y, M, C, Y, . . . on the ink ribbon R. The lengths of the index marks M1 to M3 differ. Based on the difference in the lengths, which colors sandwich the index mark can be detected. As shown in FIG. 4, position adjusting marks Tm are arranged in the lengthwise direction on the back of the tape T (a back surface of a tearaway sheet attached to the back surface of the tape T is included) at constant intervals.

The printer control section 18 shown in FIG. 1 controls printer section 17 while printing is performed under the control of the control section 11.

Figure 2:
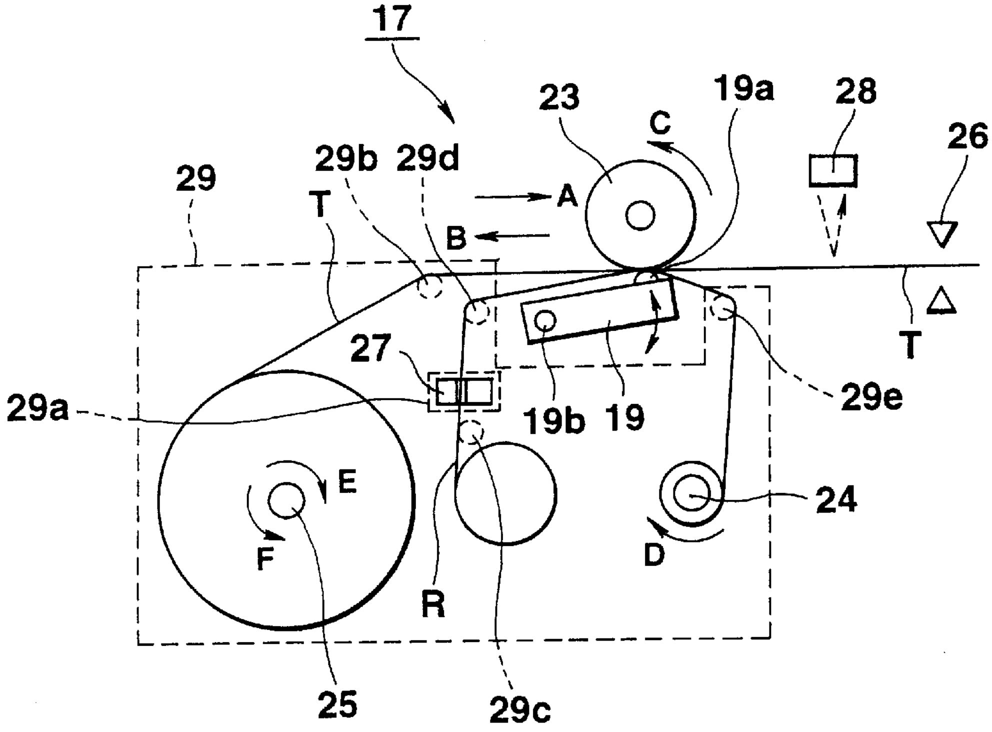
FIG. 2 is a schematic cross sectional view showing the structure of a printer section in a color tape printer shown in FIG. 1.

The thermal head 19 shown in FIGS. 1 and 2 comprises a plurality of heating bodies 19*a* arranged in line across the tape T. The head driver drives the thermal head 19 in accordance with later-described print data so that the heating bodies 19*a* irradiate heat to transfer the ink arranged on the ink ribbon R to the tape T. The motor 20 drives the thermal head 19 so that it is revolved around an axis 19*b*, and the heating bodies 19*a* are pushed against the platen roller 23 via the ink ribbon R and the tape T when an image is printed. During a later-described tape rewinding operation, the heating bodies 19*a* are released from the platen roller 23. In the initial state, the heating bodies 19*a* of the thermal head 19 are released from the platen roller 23.

The motor 20 drives the thermal head 19, the platen roller 23, the ink ribbon take-up spindle 24, the tape feed spindle 25 and the tape cutter 26 under the control of the motor driver 22.

The motor 20 rotates the platen roller 23 in the direction shown by an arrow C in FIG. 2 when an image is printed. Thus, the tape T and the ink ribbon R are carried in the direction shown by an arrow A in FIG. 2.

The motor 20 rotates the ink ribbon take-up spindle 24 in the direction shown by an arrow D in FIG. 2 to search for a next color ink in response to a detection result signal from the ink position detector 27 when the image printing for one of the colored inks, Y, M and C, is finished.

The tape feed spindle 25 is released while printing the image, and is rotated in the direction shown by an arrow E in FIG. 2 in response to the rotation of the platen roller 23. The motor 20 rotates the tape feed spindle 25 in the direction shown by an arrow F in FIG. 2 when the image printing with one of the colored inks, Y, M and C, is finished. Thus, the tape T is carried in the direction shown by an arrow B in FIG. 2 for rewinding.

After all of the images colored Y, M, and C are printed on the tape T, the tape cutter 26 is automatically activated by the motor 20 to cut the tape T on which the image is printed at a suitable position.

In this embodiment, the thermal head 19, the platen roller 23, the ink ribbon take-up spindle 24, the tape feed spindle 25, and the tape cutter 26 are driven by the motor 20, however, each of them may be driven by an exclusively assigned motor.

The ink position detector 27 comprises an optical-transmission type sensor. When the tape cartridge 29 is attached to the printer section 17, the ink position detector 27 is inserted into a cutaway portion 29*a* of the tape cartridge 29 so that an optical emitter and an optical receiver of the sensor sandwich a carriage passage for the ink ribbon R. Light emitted by the optical emitter of the sensor passes through the ink regions for Y, M and C on the ink ribbon R, however, it is blocked by the index marks M1 to M3. The ink position detector 27 detects those index marks M1 to M3 to determined the positions of the inks for Y, M and C arranged on the ink ribbon R.

A guide roller 29*b* for the tape T and guide rollers 29*c* to 29*e* for the ink ribbon R are disposed in the tape cartridge 29.

The tape position detector 28 comprises an optical-reflection type sensor, and counts the number of position adjusting marks Tm, which pass it while the tape T is carried, to detect the position of the tape.

The operation of the printer section 17 during color printing will now be described with reference to FIGS. 1 and 2.

When the printer section 17 prints a color image, the motor driver 22 drives the motor 20 to rotate the ink ribbon take-up spindle 24, thus, the ink ribbon R is carried in the direction shown by the arrow A in FIG. 2 in the initial state. The movement of the ink ribbon R is halted when it is determined that a head position for the ink for Y has reached a position corresponding to the thermal head 19*a,* based on the detection result obtained by the detection of the index marks M1 to M3 by the ink position detector 27.

Then, the motor driver 22 drives the motor 20 to drive the thermal head 19 so that the heating bodies 19*a* are pushed against the platen roller 23 via the ink ribbon R and the tape T. In this situation, the head driver 21 drives the thermal head 19 in accordance with later-described print data to cause the heating bodies 19*a* to irradiate heat. Because of this, the ink for Y arranged on the ink ribbon R is transferred to the tape T while the motor driver 22 drives the motor 20 to rotate the platen roller 23 and the ink ribbon take-up spindle 24. Thus, the ink ribbon R and the tape T are carried in the direction shown by the arrow A in FIG. 2. As a result, a Y-colored image is printed on the tape T.

When the printing of the Y-colored image is completed, the motor driver 22 drives the motor 20 to release the heating bodies 19*a* from the platen roller 23. In this situation, the motor driver 22 drives the motor 20 to rotate the tape feed spindle 24 in the direction shown by the arrow F in FIG. 2 so that the tape T is carried in the direction shown by the arrow B in FIG. 2 the same distance as the length of the Y-colored image based on a detection result provided by the tape position detector 28. Further, the motor driver 22 drives the motor 20 to rotate the ink ribbon take-up spindle 24 in the direction shown by the arrow D in FIG. 2 so that the ink ribbon R is carried until a head position of the ink for M reaches the position where the heating bodies 19*a* are located.

Then, an M-colored image is printed on the tape T in the same manner as is the Y-colored image. When the printing of the M-colored image is completed, the tape T and the ink ribbon R are carried. Then, a C-colored image is printed on the tape T in the same manner as are the Y/M-colored images.

When the printing of the C-colored image is finished, the motor driver 22 drives the motor 20 to drive the platen roller 23 for carrying the tape T in the direction shown by the arrow A in FIG. 2. When a terminal position of the printed image on the tape T reaches a position where the tape cutter 26 is located, the motor driver 22 stops the motor 20 to halt the movement of the tape T. In this situation, the motor driver 22 again drives the motor 20 to operate the tape cutter 26 and cut the tape T.

The above operation facilitates the printing of a color image is printed on the tape T.

A printing process for the color tape printer of the embodiment will now be described.

Figure 5:
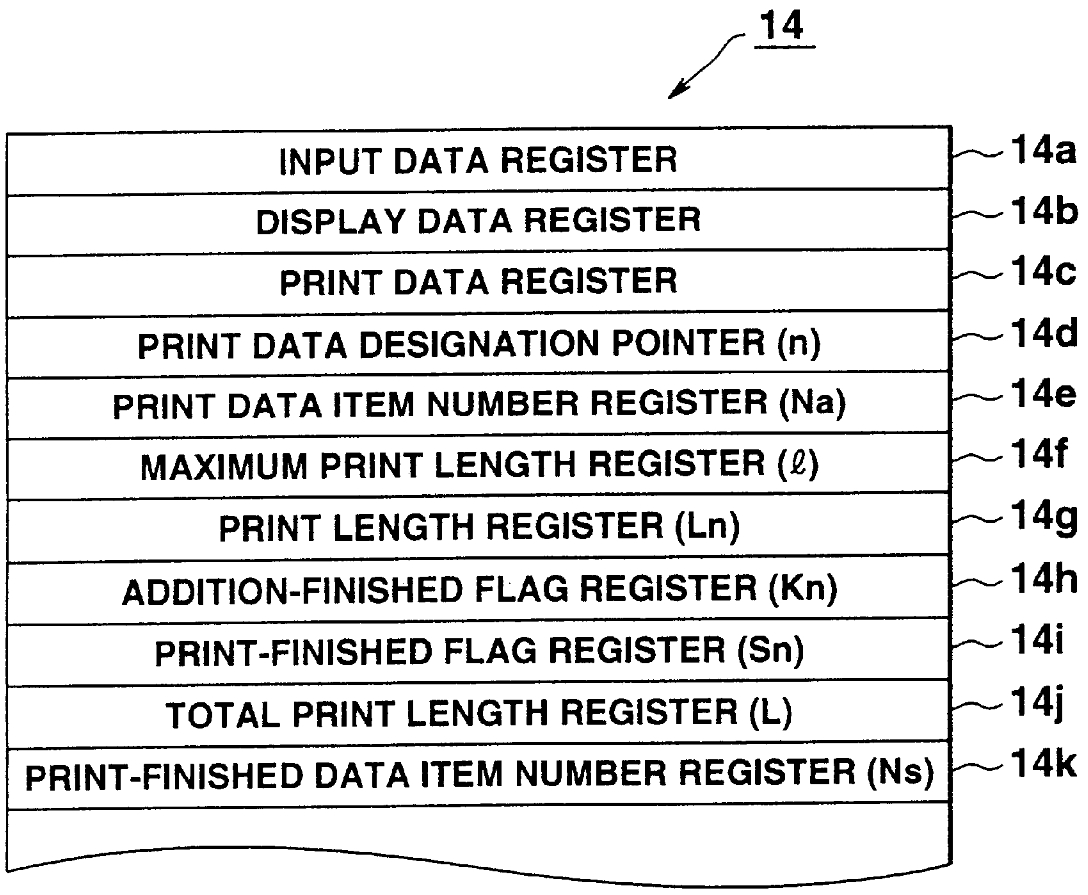
FIG. 5 is a diagram showing the structure of data registers to be stored in a RAM in a color tape printer shown in FIG. 1.

In this embodiment, when a mode is activated to execute a printing process for using the inks so that unused inks do not remain, areas for the data registers shown in FIG. 5 are prepared in the RAM 14.

The data registers, areas for which are prepared in the RAM 14, comprise an input data register 14*a,* a display data register 14*b,* a print data register 14*c,* a print data designation pointer register 14*d,* a print data item number register 14*e,* a maximum print length register 14*f,* a print length register 14*g,* an addition-finished flag register 14*h,* a print-finished flag register 14*i,* a total print length register 14*j,* and a print-finished data item number register 14*k.*

The input data register 14*a* stores code data input in response to the depression of the character/symbol input keys at the key input section 12. The display data register 14*b* stores bitmap data corresponding to images to be displayed on the display section 16. The print data register 14*c* stores bitmap data corresponding to images to be printed (hereinafter referred as print data) by the printer section 17. The print data designation pointer register 14*d* sets a pointer n for designating each of the print data items stored in the print data register 14*c.* The print data item number register 14*e* stores a total number a of the print data items stored in the print data register 14*c.* The maximum print length register 14*f* stores maximum print length l which is determined based on the length of the inks for Y, M and C arranged on the ink ribbon R. The print length register 14*g* stores print lengths Ln of images to be printed, corresponding to the respective print data items, calculated based on the format (font size, font pitch, margins, or the like) of the print data items stored in the print data register 14*c.* The addition-finished flag register 14*h* stores addition-finished flags Kn which are set to “1” when the print lengths Ln, corresponding to the respective print data items, stored in the print data register 14*c* are added to the later-described total print length L, and are reset to “0” when the print lengths Ln are not added to the total print length L. The print-finished flag register 14*i* stores print-finished flags Sn which are set when images, corresponding to the respective print data items, stored in the print data register 14*c* are printed, and are reset when images, corresponding to the print data items respectively, are not printed. The total print length register 14*j* stores the total print length L (which is “0” initially) to which the print lengths Ln of the print data items, designated by the print data designation pointer n with later-described processing, are added sequentially. The print-finished data item number register 14*k* stores the number of print data items Ns (which is “0” initially) whose corresponding print-finished flags Sn are set.

The printing process for the color tape printer in this mode will now be described with reference to a flowchart in FIG. 6.

The processing, detailed in this flowchart, starts when the print key at the key input section 12 is operated after activation of the mode to execute the printing process for using the inks so that unused inks do not remain; the print data items are stored in the print data register 14*c;* and the total number of the print data items Na is stored in the print data item number register 14*e.*

When the processing begins, the print lengths Ln are calculated in accordance with the formats for the corresponding print data items stored in the print data register 14*c.* The calculated print lengths Ln are stored in the print length register 14*g* respectively (step S1). After the print lengths Ln are calculated and stored in the print length register 14*g,* the print data designation pointer n becomes “1” as an initial value, and is stored in the print data designation pointer register 14*d* (step S2).

When the print data designation pointer n becomes “1”, a determination is made as to whether the print-finished flag Sn, which is stored in the print-finished flag register 14*i* and which corresponds to the print data item represented by the print data designation pointer n, is set or not (step S3).

If it is determined at step S3 that the print-finished flag Sn is not set, then a determination is made as to whether the addition-finished flag Kn, which is stored in the addition-finished flag register 14*h* and which corresponds to the print data item represented by the print data designation pointer n, is set or not (step S4).

If it is determined at step S3 that the print-finished flag Sn is set and if it is determined at step S4 that the addition-finished flag Kn is set, the value of the print data designation pointer n is increased by 1. The increased print data designation pointer n is stored in the print data designation pointer register 14*d* (step S5). Then the flow returns to step S3.

If it is determined at step S4 that the addition-finished flag Kn is not set, the print length Ln, which is stored in the corresponding print length register 14g and corresponds to the print data item represented by the print data designation pointer n, is added to the total print length L stored in the total print length register 14j. That addition-result is stored in the total print length register 14j as a renewed total print length L (step S6). Then, the addition-finished flag Kn, corresponding to the print data item represented by the print data designation pointer n, is set. The set addition-finished flag Kn is stored in the addition-finished flag register 14h (step S7). And a determination is made as to whether the total print length L stored in the total print length register 14j is equal to or greater than the maximum print length l stored in the maximum print length register 14f (step S8).

If it is determined at step S8 that the total print length L is not equal to or greater than the maximum print length l, the value of the print data designation pointer n is increased by 1. The increased print data designation pointer n is stored in the print data designation pointer register 14d (step S9). Further, a determination is made as to whether the value of the print data designation pointer n is greater than the number of the print data items Na stored in the print data item number register 14e (step S10).

If it is determined at step S10 that the value of the print data designation pointer n is not greater than the number of the print data items Na, the flow returns to step S3. If it is determined at step S10 that the value of the print data designation pointer n is greater than the number of the print data items Na, the flow advances to later-described step S14.

If it is determined at step S8 that the total print length L is equal to or greater than the maximum print length l, a further determination is made as to whether the total print length L is greater than the maximum print length l (step S11).

If it is determined at step 11 that the total print length L is not greater than the maximum print length l, that is, the total print length L is equal to the maximum print length l, the flow advances to later-described step S14. If it is determined at step S11 that the total print length L is greater than the maximum print length l, the print length Ln, which is stored in the corresponding print length register 14g and corresponds to the print data item represented by the print data designation pointer n, is subtracted from the total print length L stored in the total print length register 14j. That subtraction-result is stored in the total print length register 14j as a renewed total print length L (step S12). Further, the addition-finished flag Kn, corresponding to the print data item represented by the print data designation pointer n, is reset. The reset addition-finished flag Kn is stored in the addition-finished flag register 14h (step S13). Then the flow goes to step S9.

At step S14, after the addition-finished flag register 14h and the print-finished flag register 14i are referred to, images, corresponding to the print data items whose addition-finished flags Kn are set and the print-finished flags Sn are not set, are printed on the tape T using the above mentioned method. At that time, later-described cut-marks are printed among the images corresponding to the print data items. Further, the print-finished flags Sn, corresponding to the print data items having set addition-finished flags Kn, are set. The print-finished flags Sn are stored in the print-finished flag register 14i (step S15). Moreover, the number of the print-finished flags Sn, which are newly set, is added to the number of print-finished data items Ns stored in the print-finished data item number register 14k for storage as a renewed number of print-finished data items Ns (step S16). When the renewed number of print-finished data items Ns is stored in the print-finished data item number register 14k, a determination is made as to whether the number of print-finished data items is equal to the number of print data items Na stored in the print data item number register 14e (step S17).

If it is determined at step S17 that the number of print-finished data items Ns is not equal to the number of print data items Na, the total print length L stored in the total print length register 14j becomes "0" again (step S18), then the flow returns to step S2. If it is determined at step S17 that the number of print-finished data items Ns is equal to the number of print data items Na, the flow is terminated.

The operation of the color tape printer in this embodiment will now be described while exemplifying a concrete example.

Figures 7, 8A, 8B, 8C:
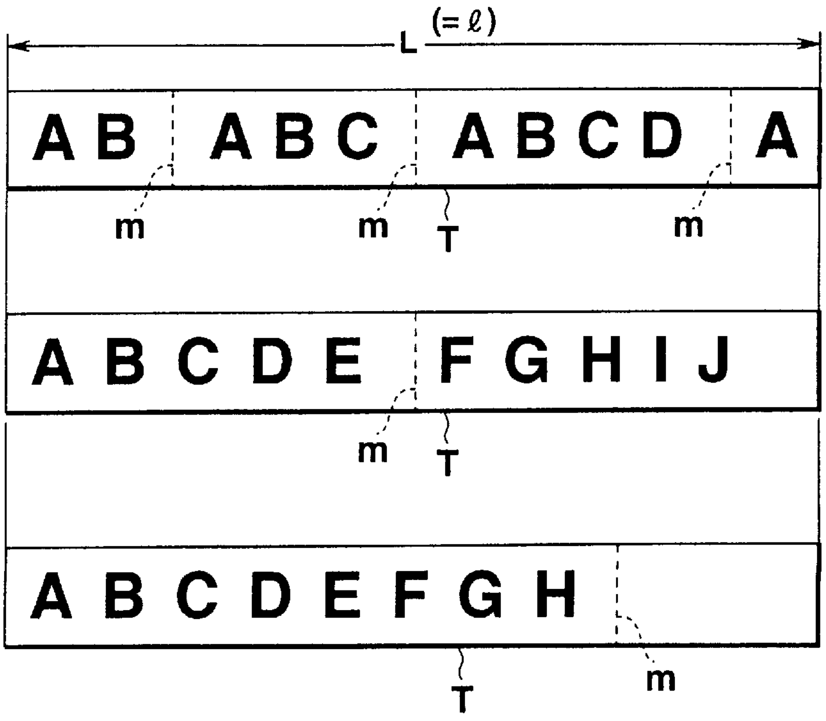
FIG. 7 is a diagram showing an example of print data for a color tape printer in the embodiment of the present invention, and showing the states of changes in print length Ln, addition flag Kn, and print flag Sn in the printing process shown in FIG. 6.
FIGS. 8A to 8C are diagrams exemplifying print data shown in FIG. 7, and showing the state of images transferred to a tape when the printing process shown in FIG. 6 is performed.

In this example, it is assumed that the length of each of the inks for Y, M and C on the ink ribbon R in the color tape printer is 10 cm, and the maximum print length l stored in the maximum print length register 14f is 10. It is also assumed that the print data items shown in FIG. 7 are stored in the print data register 14c, and the length for each of characters in the print data items is 1 cm. It is further assumed that the value of the print data designation pointer n corresponds to each of the print data items, as shown in FIG. 7, and the value of the number of the print data items Na is 7.

Figure 6:
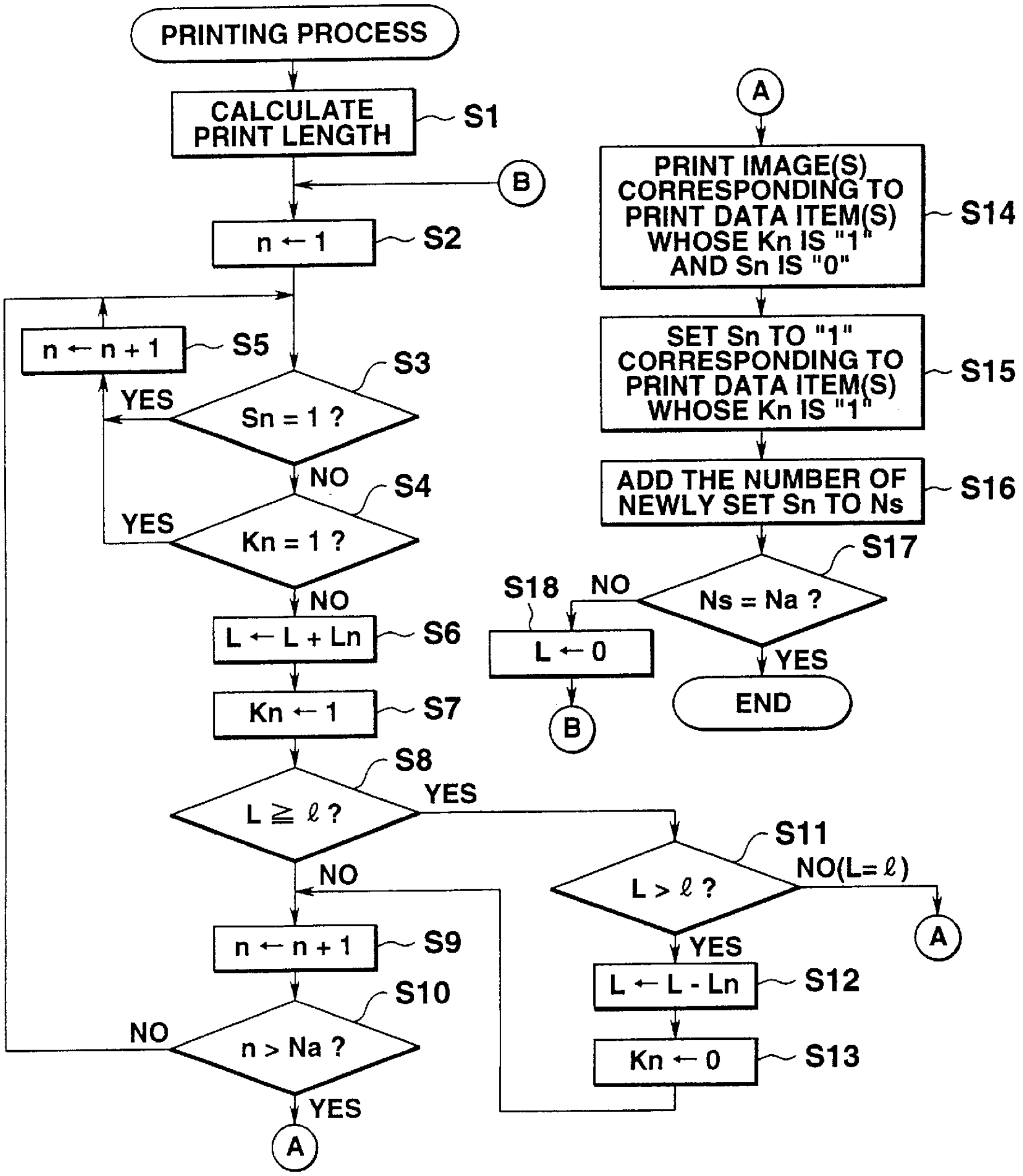
FIG. 6 is a flowchart showing a printing process for a color tape printer in an embodiment of the present invention.

When the processing, shown by a flowchart in FIG. 6, starts, the print lengths Ln, corresponding to the respective print data items, are calculated as shown in FIG. 7. The calculated print lengths Ln are stored in the print length register 14g (step S1). Then, the print data designation pointer n becomes "1", and a first print data item "AB" is designated (step S2).

A determination is made as to whether the addition-finished flag Kn and the print-finished flag Sn (n=1), corresponding to the first print data item, are set or not (steps S3, S4). In this case, because both the addition-finished flag Kn and the print-finished flag Sn are not set, the print length l (=2), corresponding to the first print data item represented by the print data designation pointer n (=1), is added to the total print length L (=0). The resultant total print length L (=2) is stored in the total print length register 14j (step S6). And the addition-finished flag Kn (n=1), corresponding to the first print data item represented by the print data designation pointer n (=1), is set. The set addition-finished flag Kn is stored in the addition-finished flag register 14h (step S7).

Then, a determination is made as to whether the total print length L is equal to or greater than the maximum print length l stored in the maximum print length register 14f (step S8). In this case, because the total print length L (=2) is less than the maximum print length l (=10), the value of the print data designation pointer n is increased by 1, therefore, it becomes "2" (step S9). Then, a determination is made as to whether the value of the print data designation pointer n is greater than the value of the number of print data items Na stored in the print data item number register 14e (step S10). In this case, because the value of the print data designation pointer n (=2) is less than the number of print data items Na (=7), the flow returns to step S3. A second print data item "ABC" is designated.

Then, a determination is made as to whether the addition-finished flag Kn and the print-finished flag Sn (n=2), corresponding to the second print data item, are set or not (steps S3, S4). In this case, because both the addition-finished flag Kn and the print-finished flag Sn are not set, the print length l (=3) corresponding to the second print data item represented by the print data designation pointer n (=2) is added to the total print length L (=2). The resultant total print length L (=5) is stored in the total print length register 14*j* (step S6). Then, the addition-finished flag Kn (n=2), corresponding to the second print data item represented by the print data designation pointer n (=2), is set. The set addition-finished flag Kn is stored in the addition-finished flag register 14*h* (step S7).

A determination is made as to whether the total print length L stored in the total print length register 14*j* is equal to or greater than the maximum print length l stored in the maximum print length register 14*f* (step S8). In this case, because the total print length L (=9) is less than the maximum print length l (=10), the value of the print data designation pointer n is increased by 1, and therefore becomes "4" (step S9). Then, a determination is made as to whether the value of the print data designation pointer n is greater than the number of print data items Na (step S10). In this case, because the value of the print data designation pointer n (=4) is less than the number of the print data items Na (=7), the flow returns to step S3, and a fourth print data item "ABCD" is designated.

Then, a determination is made as to whether the addition-finished flag Kn and the print-finished flag Sn (n=4), corresponding to the fourth print data item, are set or not (step S3, S4). In this case, because both the addition-finished flag Kn and the print-finished flag Sn are not set, the print length l (=5), corresponding to the fourth print data item represented by the print data designation pointer n (=4), is added to the total print length L (=9). The resultant total print length L (=14) is stored in the total print length register 14*j* (step S6). And the addition-finished flag Kn (n=4), corresponding to the fourth print data item represented by the print data designation pointer n (=4), is set. The set addition-finished flag Kn is stored in the addition-finished flag register 14*f* (step S7).

A determination is made as to whether the total print length L stored in the total print length register 14*j* is equal to or greater than the maximum print length l stored in the maximum print length register 14*f* (step S8). In this case, because the total print length L (=14) is greater than the maximum print length l (=10), a further determination is made as to whether the total print length L stored in the total print length register 14*j* is greater than the maximum print length l stored in the maximum print length register 14*f* (step S11). In this case, because the total print length L (=14) is greater than the maximum print length l (=10), the print length l (=5) corresponding to the fourth print data item represented by the print data designation pointer n (=4) is subtracted from the total print length L (=14). The resultant total print length (=9) is stored in the total print length register 14*j* (step S12). The addition-finished flag Kn (n=4), corresponding to the fourth print data item represented by the print data designation pointer n (=4), is reset. The reset addition-finished flag Kn is stored in the addition-finished flag register 14*h* (step S13).

Then, the value of the print data designation pointer n is increased by 1, and therefore becomes "5" (step S9). And a determination is made as to whether the value of the print data designation pointer n is greater than the value of the number of print data stored in the print data item number register 14*e* (step S10). In this case, because the value of the print data designation pointer n (=5) is less than the number of print data items Na (=7), the flow returns to step S3. Then, a fifth print data item "A" is designated.

Then, a determination is made as to whether the addition-finished flag Kn and the print-finished flag Sn (n=5), corresponding to the fifth print data item, are set or not (step S3, S4). In this case, because both the addition-finished flag Kn and the print-finished flag Sn are not set, the print length l (=1), corresponding to the fifth print data item represented by the print data designation pointer n (=4), is added to the total print length L (=9). The resultant total print length L (=10) is stored in the total print length register 14*j* (step S6). Then the addition-finished flag Kn (n=5), corresponding to the fifth print data item represented by the print data designation pointer n (=5), is set. The set addition-finished flag Kn is stored in the addition-finished flag register 14*h* (step S7).

Then, a determination is made as to whether the total print length L stored in the total print length register 14*j* is equal to or greater than the maximum print length l stored in the maximum print length register 14*f* (step S8). In this case, because the total print length L (=10) is equal to the maximum print length l (=10), a further determination is made as to whether the total print length L stored in the total print length register 14*j* is greater than the maximum print length l stored in the maximum print length register 14*f* (step S11). In this case, because the total print length L (=10) is equal to but not greater than the maximum print length l (=10), images corresponding to the first, second, third and fifth print data items having the set addition-finished flags Kn, are printed on the tape T by means of the above processing, as shown in FIG. 8A (step S14). At that time, the cut marks m are printed on boundaries of the images corresponding to the respective print data items as shown in FIG. 8A. The print-finished flags Sn respectively corresponding to the first, second, third and fifth print data items, whose corresponding images are already printed, are set. The set print-finished flags Sn are stored in the print-finished flag register 14*i* (step S15). Further, the number of the set print-finished flags Sn (=4) is added to the number of print-finished data items Ns stored in the print-finished data item number register 14*k* to be stored as a renewed number of print-finished data items Ns (=4) (step S16).

Then, a determination is made as to whether the renewed number of print-finished data items Ns is equal to the number of print data items Na (step S17). In this case, because the number of print-finished data items Ns (=4) is not equal to the number of print data items Na (=7), the total print length L becomes "0" again (step S18). Then, the value of the print data designation pointer n is set, and the first print data item "AB" is designated (step S2).

Then, a determination is made as to whether the addition-finished flag Kn and the print-finished flag Sn (n=1), corresponding to the first print data item, are set or not (steps S3, S4). In this case, because both the addition-finished flag Kn and the print-finished flag Sn are set, the value of the print data designation pointer n becomes "2" (step S5). Then, the flow returns to step S3. When the value of the print data designation pointer n is "2", because both the addition-finished flag Kn and the print-finished flag Sn are set, the flow also returns to step S3 after the value of the print data designation pointer n becomes "3" (step S5). When the value of the print data designation pointer n is "3", because both the addition-finished flag Kn and the print-finished flag Sn are set, the flow also returns to step S3 after the value of the print data designation pointer n becomes "4" (step S5).

A determination is made as to whether the addition-finished flag Kn and the print-finished flag Sn (n=4) corresponding to the fourth print data item are set or not, in a situation where the fourth print data item "ABCD" is designated (steps S3, S4). In this case, because both the addition-finished flag Kn and the print-finished flag Sn are not set, the print length l (=5), corresponding to the fourth print data item represented by the print data designation pointer n (=4), is added to the total print length L (=0). The resultant total print length L (=5) is stored in the total print length register 14*j* (step S6). Then, the addition-finished flag Kn (n=4), corresponding to the first print data item represented by the print data designation pointer n (=4), is set. The set addition-finished flag Kn is stored in the addition-finished flag register 14*h* (step S7).

Then, a determination is made as to whether the total print length L stored in the total print length register 14*j* is equal to or greater than the maximum print length l stored in the maximum print length register 14*h* (step S8). In this case, because the total print length L (=5) is less than the maximum print length l (=10), the value of the print data designation pointer n is increased by 1, and therefore becomes "5" (step S9). Then, a determination is made as to whether the value of the print data designation pointer n is greater than the number of print data items Na stored in the print data item number register 14*e* (step S10). Because the value of the print data designation pointer n (=5) is less than the number of the print data items Na (=7), the fifth print data item "A" is designated after the flow returns to step S3.

Then a determination is made as to whether the addition-finished flag Kn and the print-finished flag Sn (n=1), corresponding to the fifth print data item, are set or not (steps S3, S4). In this case, because both the addition-finished flag Kn and the print-finished flag Sn are set, the value of the print data designation pointer n becomes "6" (step S5). Then, the flow returns to step S3 after a sixth print data item "FGHIJ" is designated.

Then, a determination is made as to whether the addition-finished flag Kn and the print-finished flag Sn (n=6), corresponding to the sixth print data item, are set or not (steps S3, S4). In this case, because both the addition-finished flag Kn and the print-finished flag Sn are not set, the print length l (=5), corresponding to the sixth print data item represented by the print data designation pointer n (=6), is added to the total print length L (=5). The resultant total print length L (=10) is stored in the total print length register 14*j* (step S6). The addition-finished flag Kn (n=5), corresponding to the sixth print data item represented by the print data designation pointer n (=6), is set. The set addition-finished flag Kn is stored in the addition-finished flag register 14*h* (step S7).

Then, a determination is made as to whether the total print length L stored in the total print length register 14*j* is equal to or greater than the maximum print length l stored in the maximum print length register 14*f* (step S8). In this case, because the total print length L (=10) is equal to the maximum print length l (=10), a further determination is made as to whether the total print length L stored in the total print length register 14*j* is greater than the maximum print length l stored in the maximum print length register 14*f* (step S11). In this case, because the total print length L (=10) is equal to but not greater than the maximum print length l (=10), images corresponding to the fourth and sixth print data items, having the addition-finished flags Kn, are printed on the tape T as shown in FIG. 8B (step S14). At that time, the print-finished flags Sn corresponding to the fourth and sixth print data items, whose corresponding images are already printed, are set. The set print-finished flags Sn are stored in the print-finished flag register 14*i* (step S15). Further, the number of the set print-finished flags Sn (=2) is added to the number of the print-finished data items Ns (=6) to be stored as a renewed number of the print-finished print data items Ns (=6) (step S16).

Then, a determination is made as to whether the renewed number of the print-finished data items Ns is equal to the number of the print data items Na (step S17). In this case, because the number of the print-finished data items Ns (=6) is not equal to the number of the print data items Na (=7), the total print length L becomes "0" again (step S18). Then, the value of the print data designation pointer n becomes "1", and the first print data item "AB" is designated (step S2).

In the same manner as the above description, a determination is made, from the first print data item in order, as to whether the corresponding addition-finished flags Kn and the print-finished flags Sn are set or not (steps S3, S4). In this case, because the addition-finished flags Kn and the print-finished flags Sn, corresponding to the first print data item to the sixth print data item, are set, the value of the print data designation pointer n becomes "7" (step S5). Then, a seventh print data item "ABCDEFGH" is designated.

Then, a determination is made as to whether the addition-finished flag Kn and the print-finished flag Sn (n=7), corresponding to the seventh print data item, are set or not (steps S3, S4). In this case, because both the addition-finished flag Kn and the print-finished flag Sn are not set, the print length l (=8), corresponding to the seventh print data item represented by the print data designation pointer n (=1), is added to the total print length L (=0). The resultant total print length L (=8) is stored in the total print length register 14*j* (step S6). Then, the addition-finished flag Kn (n=7), corresponding to the seventh print data item represented by the print data designation pointer (=7), is set to "1". The set addition-finished flag Kn (n=7) is stored in the addition-finished flag register 14*h* (step S7).

Then, a determination is made as to whether the total print length L stored in the total print length register 14*j* is equal to or greater than the maximum print length l stored in the maximum print length register 14*f* (step S8). In this case, because the total print length L (=8) is less than the maximum print length l (=10), the value of the print data designation pointer n is increased by 1, and therefore becomes "8" (step S9). Then, a determination is made as to whether the value of the print data designation pointer n is greater than the number of print data items Na stored in the print data item number register 14*e* (step S10). Because the value of the print data designation pointer n (=8) is greater than the number of the print data items Na (=7), an image corresponding to the seventh print data item, having the set addition-finished flag Kn, is printed on the tape T as shown in FIG. 8C (step S14). At that time, the print-finished flag Sn corresponding to the seventh print data item, whose corresponding image is already printed, is set. The set print-finished flag Sn is stored in the print-finished flag register 14*i* (step S15). Further, the number of the set print-finished flags Sn (=1) is added to the number of the print-finished data items Ns (=6) to be stored as a renewed number for the print-finished data items Ns (=7) (step S16).

Then, a determination is made as to whether the renewed number of print-finished data items Ns is equal to the number of the print data items Na (step S17). In this case, because the number of the print-finished data items Ns (=7) is equal to the number of the print data items Na (=7), the processing shown in the flowchart in FIG. 6 is terminated.

In this example, all images corresponding to the seven print data items stored in the print data register 14*c* can be printed with three times of the print operation by means of the processing described in this embodiment. Thus, 30 cm is used of each of the respective inks for Y, M and C arranged on the ink ribbon R. On the other hand, when images corresponding to seven print data items, as well as the case described in this example, are printed and conventional processing is used, the printing operation must be performed seven times. Therefore, the conventional processing requires that 70 cm be used of each of the respective inks for Y, M and C arranged on the ink ribbon R. However, the actual length of an image to be printed is 28 cm. While the processing described in this embodiment uses 93% of the inks for Y, M and C arranged on the ink ribbon R, the conventional processing uses only 40% of them. Therefore, as described in this example, with the present invention, color images can be printed, while using the color inks arranged on the ink ribbon R so that unused inks do not remain.

As described above, the color tape printer described in this embodiment can print color images while using the inks on the ink ribbon R so that unused inks do not remain.

Figure 9:
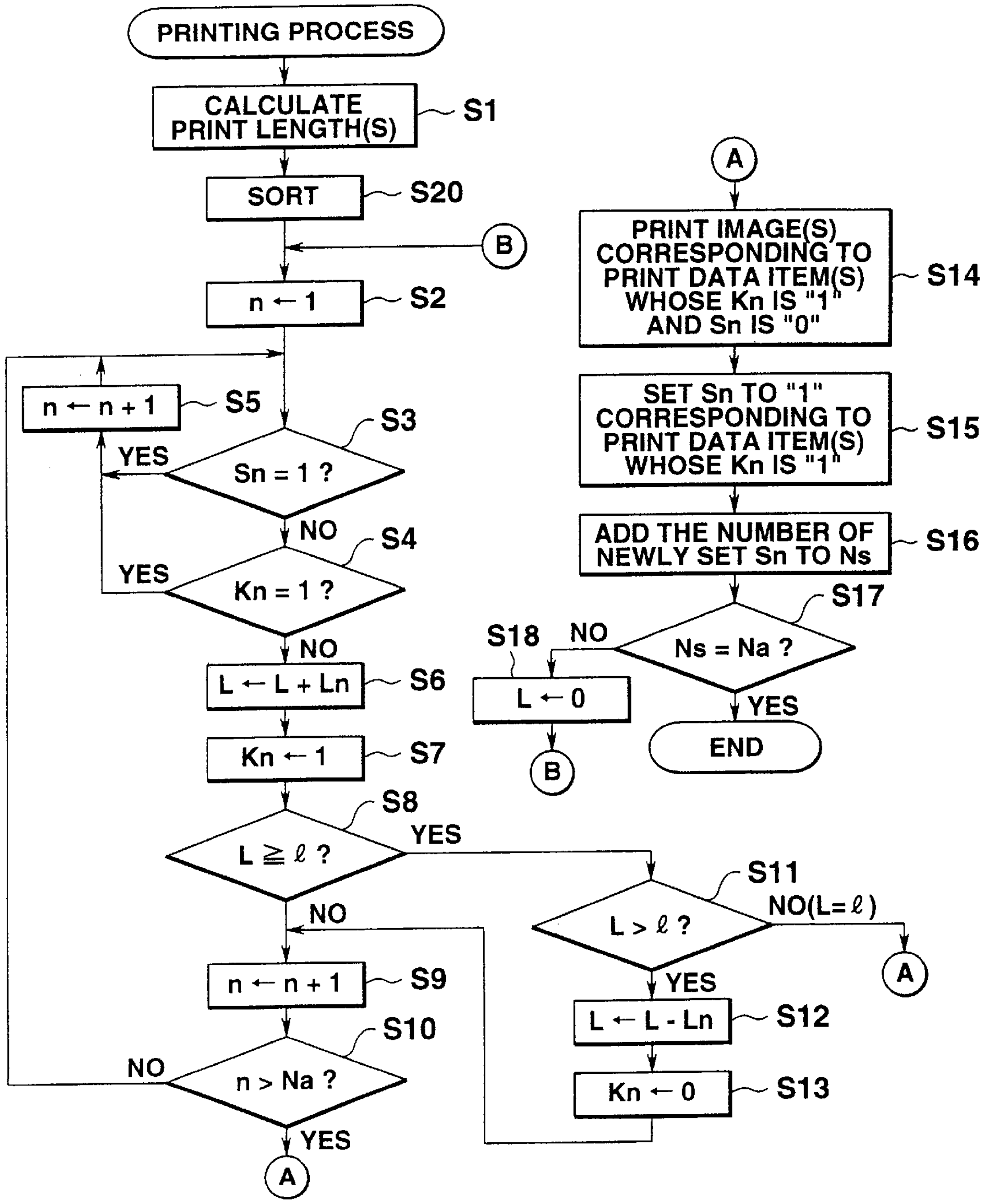
FIG. 9 is a flowchart showing the other example of a printing process for a color tape printer in an embodiment of the present invention.

In the above described embodiment, the print lengths Ln of the print data items are added sequentially from the print data register in the order in which stored to determine a combination having a length that is the nearest to the maximum print length l. On the contrary, the print lengths Ln may be added sequentially, in order of their lengths, from the longest one to the shortest one or from the shortest one to the longest one, to determine which combination has a length that is the nearest to the maximum print length l. In this case, processing for sorting the print data items in accordance with the print length Ln (step S20) may be performed between step S1 and step S2, as shown by a flowchart in FIG. 9. Steps other than step S20 in the flowchart in FIG. 9 are the same as steps in the flowchart in FIG. 6.

In the above described embodiment, whenever the combination of the print data items that is the nearest in length to the maximum print length l is obtained, images corresponding to the print data items are printed. On the contrary, images corresponding to each combination of the print data items may be printed sequentially after the combinations of the print data items in all patterns have been obtained.

Figure 10:
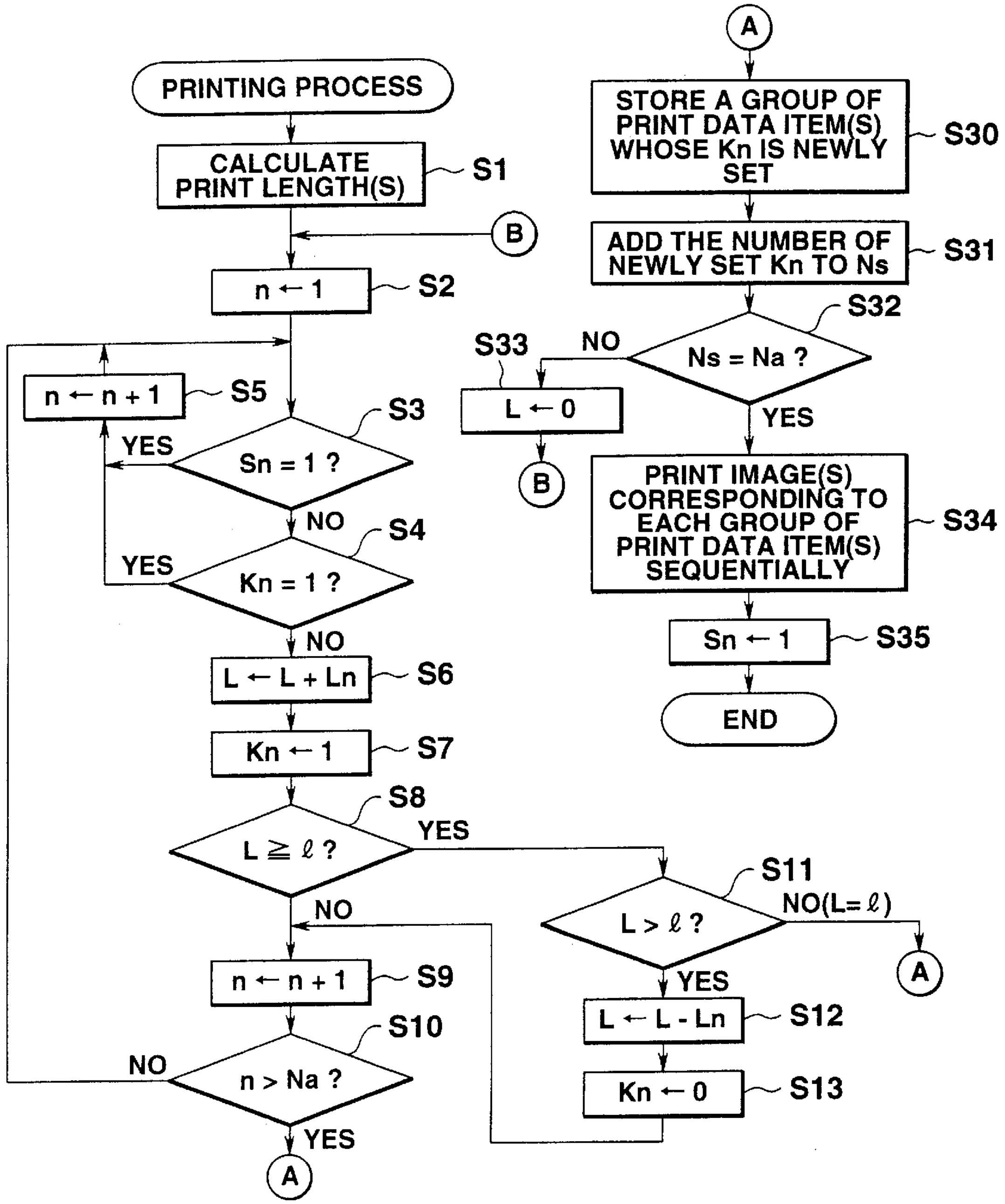
FIG. 10 is a flowchart showing the other example of a printing process for a color tape printer in an embodiment of the present invention.

FIG. 10 shows a flowchart for explaining the execution of the processing. In this flowchart, steps S1 to S13 are the same as steps S1 to S13 in the flowchart shown in FIG. 6. However, when it is determined at step S10 that the value of the print data designation pointer n is greater than the number of print data items Na, or it is determined at step S11 that the total print length L is not greater than the maximum print length l, the flow goes to step S30. The code Ns does not indicate the number of the print data items Na whose corresponding images have already been printed, but instead, indicates the number of the print data items Na whose print length L has already been added to the total print length L.

At step S30, combinations of the print data items whose corresponding addition-finished flags Kn are newly set at step S7 and whose corresponding addition-finished flags Kn are not reset at step S13 are stored in the RAM 14. Then, the number of the set addition-finished flags Kn are added to the number of addition-finished data items Ns (step S31). A determination is made as to whether the number of addition-finished data items Ns is equal to the number of the print data items Na stored in the print data item number register 14*e* (step S32).

When it is determined at step S32 that the number of the addition-finished data items Ns is not equal to the number of the print data items Na, the total print length L to be stored in the total print length register 14*j* becomes "0" again (step S33), and the flow returns to step S2. When it is determined at step S32 that the number of the print-finished data items Ns is equal to the number of the print data items Na, the printer section 17 sequentially prints each, or the combinations, of the print data items stored in the RAM 14 at step S30 (step S34). When the printing is completed, all the corresponding print-finished flags Sn are set (step S35) and the processing is terminated.

In the above described embodiment, print data comprising bitmap patterns corresponding to code data (input data), such as characters input at the key input section 12, are stored in the print data register 14*c*, print data item by print data item. However, after a combination of the print data items to be printed has been assembled, bitmap patterns corresponding to the combination of the print data items may be developed.

In the above described embodiment, the cut marks m are printed at the boundaries of images corresponding to the print data items. However, the cut marks m may not be printed. In this case, when boundary positions among the images corresponding to the print data items reach the tape cutter 26, the printing operation is stopped once and the tape cutter 26 is activated to cut the tape T.

In the above described embodiment, the ink position detector 27 detects the index marks M1 to M3 to detect the positions of the inks for Y, M and C arranged on the ink ribbon R, and the tape position detector 28 counts the number of the position adjusting marks Tm, which are carried through the tape position detector 28 with the tape T, to detect the position of the tape T. However, methods for detecting the inks for Y, M and C arranged on the ink ribbon R, and methods for detecting the position of the tape T are not limited to these. For example, the positions of the inks for Y, M and C arranged on the ink ribbon R and the position of the tape T may be detected based on the cycles of the platen roller 23, the ink ribbon take-up spindle 24 and/or the tape feed spindle 25.

In the above described embodiment, the case where the present invention is adapted for a color tape printer, which uses a thermal transfer method for sequentially transferring the three colored inks, Y, M and C, which are sequentially arranged on the ink ribbon R, to the tape T to print color images is explained. However, the present invention may be adapted for a color tape printer using another method for transferring inks arranged on an ink ribbon to the tape T, such as a dot impact method. The present invention does not limit the colors of the inks on the ink ribbon to the three colors Y, M and C, but may be adapted for a color tape printer which uses an ink ribbon further comprising black inks (K) or transparent inks for coating a surface of a printed tape.

The ROM 13 for storing the processing program for the control section 11 described in the above embodiment may be comprised of a ROM card which is attachable to the tape printer, and a program for executing the printing method of the present invention may be provided with the ROM card. The ROM 13 for storing the processing program for the control section 11 may be comprised of a flash EEPROM which is electrically erasable and programmable. A program for executing the printing method of the present invention stored on a floppy disk or a CD-ROM may be installed in the flash EEPROM.

What is claimed is:

1. A printing apparatus for printing an image by means of sequentially transferring inks for a plurality of colors, which are repeatedly arranged on an ink ribbon (R) with each having a predetermined length (l), to an elongated recording sheet (T) so that the transferred inks are overlapped, said printing apparatus comprising:

data input means (12) for inputting a plurality of data items representing images to be printed;

print length calculation means (11, S1) for calculating each of print lengths (Ln) of the images to be printed in response to said inputted plurality of data items;

data storage means (14*a*, 14*c*) for storing said inputted plurality of data items;

group calculation means (11, S3–S13) for selecting a group of said data items whose total print lengths (Ln), calculated by said print length calculation means (11, S1) from the plurality of data items stored in said data storage means (14*a*, 14*c*), does not exceed said predetermined length (l); and printing means (17) for printing an image corresponding to said group of the data items selected by said group calculation means (11, S3–S13) by sequentially transferring said inks for said plurality of colors to said recording sheet (T).

2. The printing apparatus according to claim 1, further comprising print length storage means (14*g*) for storing each of said print lengths (Ln) calculated by said print length calculation means (11, S1), while associating said print lengths (Ln) with said plurality of data items, and wherein said group calculation means (11, S3–S13) selects said group of the data items while referring to said print lengths (Ln) stored in said print length storage means (14*g*).

3. The printing apparatus according to claim 1, further comprising group information storage means (14*h*) for storing group information (Kn) representing said data items included in said group calculated by said group calculation means (11, S3–S13) while associating said group information (Kn) with said data items, and wherein said printing means (17) prints images corresponding to said data items in accordance with said group information (Kn) stored in said group information storage means (14*h*).

4. The printing apparatus according to claim 1, further comprising print information storage means (14*i*) for storing print information (Sn) representing said data items included in said group printed by said printing means (17), while associating said print information (Sn) with said data items, and wherein said printing means prints images corresponding to said data items.

5. The printing apparatus according to claim 1, further comprising data sorting means (11, S0) for sorting said plurality of data items stored in said data storage means (14*a*, 14*c*) in accordance with said print lengths (Ln) calculated by said print length calculation means (11, S1), and wherein said group calculation means (11, S3–S13) selects a group of said data items from said plurality of data items sorted by said data sorting means (11, S0).

6. The printing apparatus according to claim 1, wherein said group calculation means (11, S3–S13) comprises:

addition means (11, S6 and 14*j*) for sequentially adding the print lengths (Ln) corresponding to said plurality of data items stored in said data storage means (14*a*, 14*c*);

first length detection means (11, S8) for detecting whether the length indicated by the addition-result (L) of said addition means (11, S6 and 14*j*) is shorter than said predetermined length (l);

second length detection means (11, S11) for further detecting whether the length indicated by the addition-result (L) of said addition means (11, S6 and 14*j*) is equal to said predetermined length (l) when said first length detection means (11, S8) determines that said length indicated by the addition-result (L) is not shorter than said predetermined length (l);

subtraction means (11, S12 and 14*j*) for subtracting said print length (Ln) last added by said addition means (11, S12 and 14*j*) when said second length detection means (11, S11) determines that said length indicated by the addition-result (L) is not equal to said predetermined length (l); and remaining data detection means (11, S10) for detecting whether said data items, whose corresponding print lengths (Ln) are not targeted to be added by said addition means (11, S6 and 14*j*), remain or not;

wherein said group of the data items comprises said data items whose corresponding print lengths (Ln) are targeted to be added by said addition means (11, S6 and 14*j*) and whose corresponding print lengths (Ln) are not targeted to be subtracted by said subtraction means (11, S6 and 14*j*); and wherein said printing means (17) prints images corresponding to said data items when said second length detection means (11, S11) determines that said length indicated by the addition-result (L) is equal to said predetermined length (l), or when said remaining data detection means (11, S18) determines that none of said data items, whose corresponding print lengths are not targeted to be added, remain.

7. The printing apparatus according to claim 1, wherein said printing means (17) prints images corresponding to said selects group of the data items once said group calculation means (11, S3–S13) selects said data item group.

8. The printing apparatus according to claim 1, further comprising group storage means (14) for storing a plurality of groups of said data items selects by said group calculation means (11, S3–S13), and wherein said printing means (17) prints images corresponding to said group of data items stored in said group storage means (14).

9. The printing apparatus according to claim 1, wherein said printing means (17) prints marks at boundaries of images corresponding to data items in said group when the images correspond to said groups of the data items.

10. A printing method for printing an image by means of sequentially transferring inks, which are repeatedly arranged on an ink ribbon (R) with each having a predetermined length (l), to an elongated recording sheet (T) so that the transferred inks are overlapped, said printing method including:

a print length calculation step (S1) of calculating each of print lengths (Ln) of images to be printed corresponding to a plurality of input data items representing the images to be printed;

a group calculation step (S3–S13) of selecting a group of said input data items whose total for the print lengths (Ln), calculated in said print length calculation step (S1) from said plurality of input data items, does not exceed said predetermined length (l); and a print step (S14) of printing an image corresponding to said group of data items, selected in said group calculation step (S3–S13), by sequentially transferring said inks for said plurality of colors to said recording sheet (T).

11. A computer-readable storage medium storing a program for realizing a printing method for printing an image by means of sequentially transferring inks for a plurality of colors, which are repeatedly arranged on an ink ribbon (R) with each having a predetermined length (l), to an elongated recording sheet (T) so that the transferred inks are overlapped, said program comprising:

print length calculation means (S1) for enabling a computer to calculate each of print lengths of images to be printed in response to a plurality of input data items representing the images to be printed;

group calculation means for enabling the computer to select a group of said data items whose total print lengths (Ln) calculated from said plurality of input data items does not exceed said predetermined length (l); and print means (S14) for enabling printing of an image corresponding to said selected group of data items by sequentially transferring said inks for the plurality of colors to said recording sheet (T).

12. A printing apparatus for printing an image by means of sequentially transferring inks for a plurality of colors, which are repeatedly arranged on an ink ribbon (R) with each having a predetermined length (l), to an elongated recording sheet (T) so that the transferred inks are overlapped, said printing apparatus comprising:

data input means (12) for inputting a plurality of data items representing images to be printed;

print length calculation means (11, S1) for calculating each of print lengths (Ln) of the images to be printed in response to said inputted plurality of data items;

data storage means (14*a,* 14*c*) for storing said inputted plurality of data items;

group calculation means (11, S3–S13) for selecting a group of said data items whose total print lengths (Ln), calculated by said print length calculation means (11, S1) from the plurality of data items stored in said data storage means (14*a,* 14*c*), does not exceed said predetermined length (l); and printing means (17) for printing an image corresponding to said group of data items selected by said group calculation means (11, S3–S13) in a printing order different from an input order of said data items by sequentially transferring said inks for said plurality of colors to said recording sheet (T).

13. The printing apparatus according to claim 12, further comprising print length storage means (14*g*) for storing each of said print lengths (Ln) calculated by said print length calculation means (11, S1), while associating said print lengths (Ln) with said plurality of data items, and wherein said group calculation means (11, S3–S13) selects said group of the data items while referring to said print lengths (Ln) stored in said print length storage means (14*g*).

14. The printing apparatus according to claim 12, further comprising group information storage means (14*h*) for storing group information (Kn) representing said data items included in said group calculated by said group calculation means (11, S3–S13) while associating said group information (Kn) with said data items, and wherein said printing means (17) prints images corresponding to said data items in accordance with said group information (Kn) stored in said group information storage means (14*h*).

15. The printing apparatus according to claim 12, further comprising print information storage means (14*i*) for storing print information (Sn) representing said data items included in said group printed by said printing means (17), while associating said print information (Sn) with said data items, and wherein said printing means prints images corresponding to said data items.

16. The printing apparatus according to claim 12, wherein said group calculation means (11, S3–S13) comprises:

addition means (11, S6 and 14*j*) for sequentially adding the print lengths (Ln) corresponding to said plurality of data items stored in said data storage means (14*a,* 14*c*);

first length detection means (11, S8) for detecting whether the length indicated by the addition-result (L) of said addition means (11, S6 and 14*j*) is shorter than said predetermined length (l);

second length detection means (11, S11) for further detecting whether the length indicated by the addition-result (L) of said addition means (11, S6 and 14*j*) is equal to said predetermined length (l) when said first length detection means (11, S8) determines that said length indicated by the addition-result (L) is not shorter than said predetermined length (l);

subtraction means (11, S12 and 14*j*) for subtracting said print length (Ln) last added by said addition means (11, S12 and 14*j*) when said second length detection means (11, S11) determines that said length indicated by the addition-result (L) is not equal to said predetermined length (l); and remaining data detection means (11, S10) for detecting whether said data items, whose corresponding print lengths (Ln) are not targeted to be added by said addition means (11, S6 and 14*j*), remain or not;

wherein said group of the data items comprises said data items whose corresponding print lengths (Ln) are targeted to be added by said addition means (11, S6 and 14*j*) and whose corresponding print lengths (Ln) are not targeted to be subtracted by said subtraction means (11, S6 and 14*j*); and wherein said printing means (17) prints images corresponding to said data items when said second length detection means (11, S11) determines that said length indicated by the addition-result (L) is equal to said predetermined length (l), or when said remaining data detection means (11, S18) determines that none of said data items, whose corresponding print lengths are not targeted to be added, remain.

17. The printing apparatus according to claim 12, wherein said printing means (17) prints images corresponding to said selects group of the data items once said group calculation means (11, S3–S13) selects said data item group.

18. The printing apparatus according to claim 12, further comprising group storage means (14) for storing a plurality of groups of said data items selected by said group calculation means (11, S3–S13), and wherein said printing means (17) prints images corresponding to said group of data items stored in said group storage means (14).

19. The printing apparatus according to claim 12, wherein said printing means (17) prints marks at boundaries of images corresponding to data items in said group when the images correspond to said groups of the data items.

20. A printing method for printing an image by means of sequentially transferring inks, which are repeatedly arranged on an ink ribbon (R) with each having a predetermined length (l), to an elongated recording sheet (T) so that the transferred inks are overlapped, said printing method including:

a print length calculation step (S1) of calculating each of print lengths (Ln) of images to be printed corresponding to a plurality of input data items representing the images to be printed;

a group calculation step (S3–S13) of selecting a group of said input data items whose total for the print lengths (Ln), calculated in said print length calculation step (S1) from said plurality of input data items, does not exceed said predetermined length (l); and a print step (S14) of printing an image corresponding to said group of data items, selected by said group calculation step (S3–S13), in a printing order different from an input order of said data items by sequentially transferring said inks for said plurality of colors to said recording sheet (T).

21. A computer-readable storage medium storing a program for realizing a printing method for printing an image by means of sequentially transferring inks for a plurality of colors, which are repeatedly arranged on an ink ribbon (R) with each having a predetermined length (l), to an elongated recording sheet (T) so that the transferred inks are overlapped, said program comprising:

print length calculation means (S1) for enabling a computer to calculate each of print lengths of images to be printed in response to a plurality of input data items representing the images to be printed;

group calculation means for enabling the computer to select a group of said data items whose total print lengths (Ln) calculated from said plurality of input data items does not exceed said predetermined length (l); and print means (S14) for enabling printing of an image corresponding to said selected group of data items in a printing order different from an input order of said data items by sequentially transferring said inks for the 1556X plurality of colors to said recording sheet (T).

* * * * *